United States Patent [19]

Cullum

[11] Patent Number: 4,694,468
[45] Date of Patent: Sep. 15, 1987

[54] APPARATUS USEFUL IN CHANNEL EQUALIZATION ADJUSTMENT

[75] Inventor: Dennis F. Cullum, Leucadia, Calif.

[73] Assignee: Eastman Kodak Company, Rochester, N.Y.

[21] Appl. No.: 855,562

[22] Filed: Apr. 25, 1986

[51] Int. Cl.<sup>4</sup> ............................................. H04B 17/00
[52] U.S. Cl. ...................................... 375/10; 375/101; 324/77 R
[58] Field of Search ........................... 375/10, 11, 101; 328/164; 324/77 R, 77 D

[56] References Cited

U.S. PATENT DOCUMENTS

| | | | |
|---|---|---|---|
| 3,506,918 | 4/1970 | Perrault | 375/10 |
| 4,321,636 | 3/1982 | Lenz | 360/77 |
| 4,376,309 | 3/1983 | Fenderson et al. | 375/101 |
| 4,449,223 | 5/1984 | Liskov et al. | 375/10 |
| 4,475,210 | 10/1984 | Couch | 375/10 |

OTHER PUBLICATIONS

"Digital Communications", Feher, Prentice Hall, 1981, pp. 232, 235-236.

*Primary Examiner*—Stewart J. Levy
*Assistant Examiner*—Louis M. Arana
*Attorney, Agent, or Firm*—Daniel Robbins

[57] ABSTRACT

In equalizing a digital channel, impulses are applied to the channel input at the Nyquist rate. The channel response is sampled to determine its amplitude values at specified sampling times, and the amplitude values are converted into corresponding pulse duration signals. The pulse duration signals are applied to a time interval analyzer whereby the signal input durations are displayed in the form of a histogram showing the number of pulses of a given duration as a function of pulse duration. The time dispersion of the displayed pulse durations measures the intersymbol interference present, and is a measure of the quality of the equalization.

6 Claims, 31 Drawing Figures

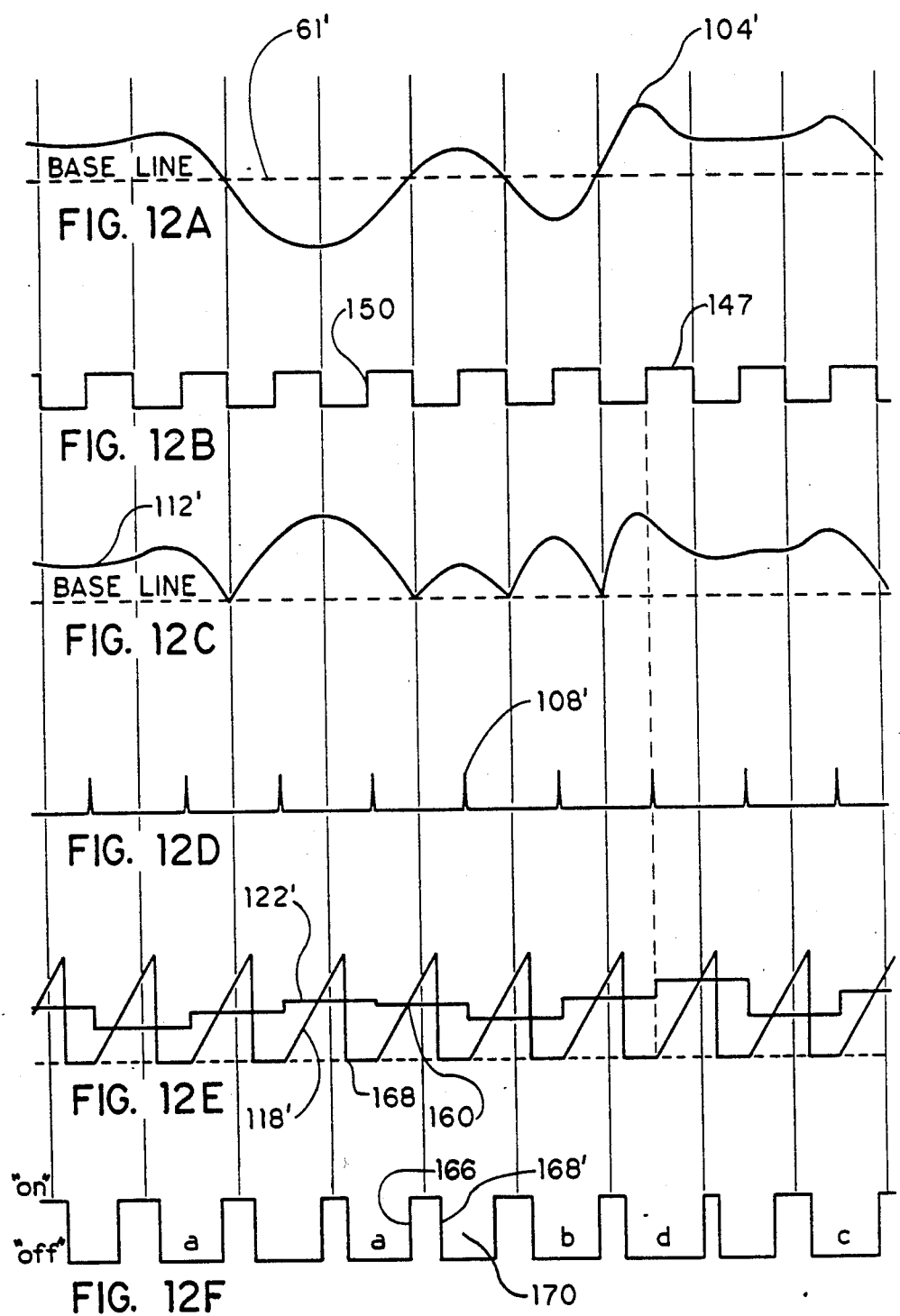

APPARATUS USEFUL IN CHANNEL EQUALIZATION ADJUSTMENT

BACKGROUND OF THE INVENTION

1. Field of the Invention

This invention relates to the measurement of equalizer performance in a digital signal channel, and in particular to the measurement of equalizer performance wherein a quantitative display of the degree of equalization is provided.

The invention, as well as the prior art, will be described with reference to the drawings of which:

FIGS. 1 A–D, 2 A–B, 3, 4 A–B, 5, 6 A–D and 10 A–C are waveforms useful in understanding the background of the invention;

Figure 9:
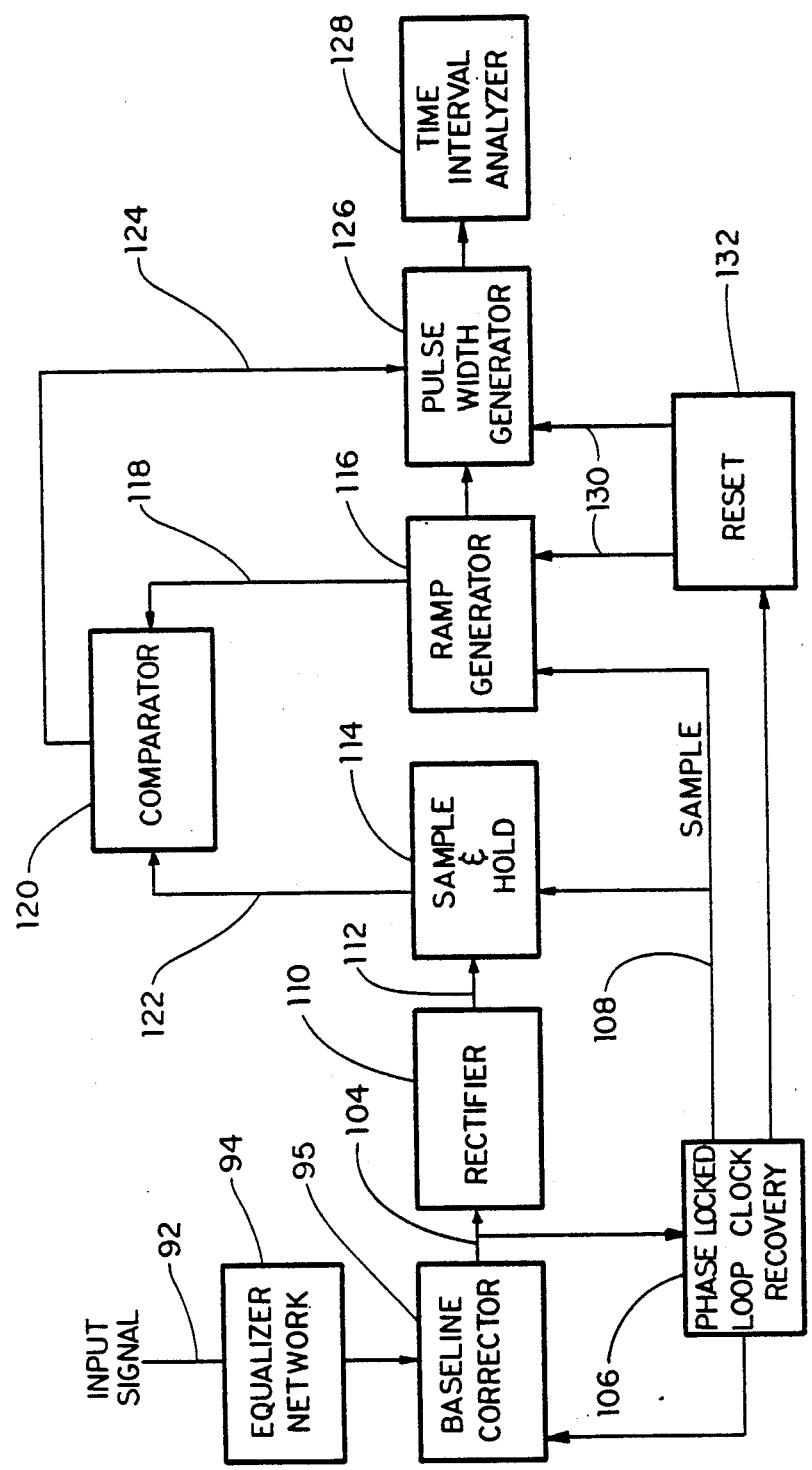
FIG. 9 is a block diagram of apparatus embodying the invention.

FIGS. 11 A–E depict a display of signals useful in understanding the performance of the invention; and FIGS. 12 A–F are a set of waveforms related to the operation of the embodiment of the invention depicted in FIG. 9.

2. Description Relative to the Prior Art

The use of equalization to correct transmission channel distortion is well known in the art. Early applications were in telephony where "loading coils" were used to compensate for the high frequency losses experienced in twisted pair transmission lines. Later improvements in equalization techniques included development of lumped constant equalizers which were used in equalizing analog transmission channels and analog signal storage devices such as magnetic recording storage systems. Because such transmission channels and storage devices were used to process analog signals, the equalization was directed towards compensating for the attenuation distortion of the channel. Correction of phase distortion was of minor importance as the primary analog signals involved were voice signals, and the ear is relatively insensitive to phase distortion. The equalization process consisted of sequentially applying sinusoidal signals of various frequencies to the channel and adjusting the equalizer for uniform frequency response across the channel bandwidth. Modernly, many communication channels and storage devices are called upon to transmit or store digital data. In the transmission of digital data not only must the channel be equalized for uniform amplitude response, but the equalization must provide a linear phase shift characteristic as a function of increasing frequency. This requires more sophisticated equalization techniques than the application of sinusoidal signals described above.

Figure 1A:
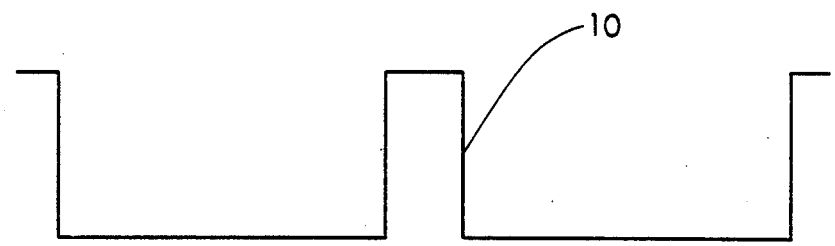
Figure 1B:
Figure 1C:
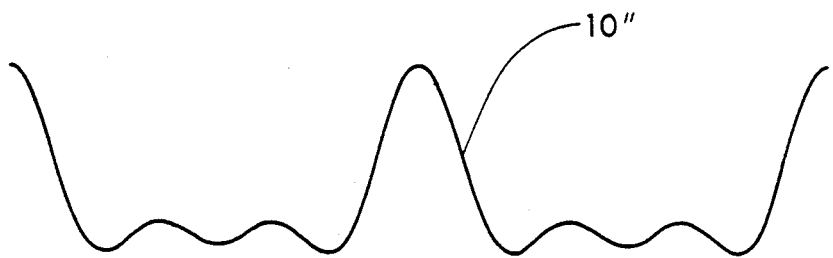
Figure 1D:

Before describing the present invention, the reasons for the aforementioned amplitude and phase response requirements will be discussed. An ideal pulse digital waveform 10 is represented in FIG. 1A. If the waveform 10 were transmitted over a channel with no attenuation and no phase distortion within the signal bandwidth, the reproduced signal waveform would be identical to the transmitted waveform 10 of FIG. 1A. If, however, the waveform 10 were transmitted over a channel which cut off above some nominal frequency, the resultant digital waveform would be distorted. Referring to FIG. 1B, the waveform 10' represents the waveform 10 after transmission through a channel which completely attenuates all frequency components above the 7th harmonic of the fundamental frequency. [In the drawings, different but corresponding elements are designated by the same character, albeit that the corresponding characters are primed.] If the channel bandwidth were further restricted so that all components above the 3rd harmonic were attenuated, the further distorted waveform 10" shown in FIG. 1C would obtain. On the other hand, if the channel was deficient in low frequency response, so that the fundamental were completely attenuated, but the 2nd through 7th harmonics were transmitted, the waveform 10' would be distorted into the waveform 10''' as shown in FIG. 1D. It will be appreciated that one of the required conditions for non-distorted transmission of digital data is a uniform frequency response over the bandwidth encompassed by the digital signal components.

Figure 2A:
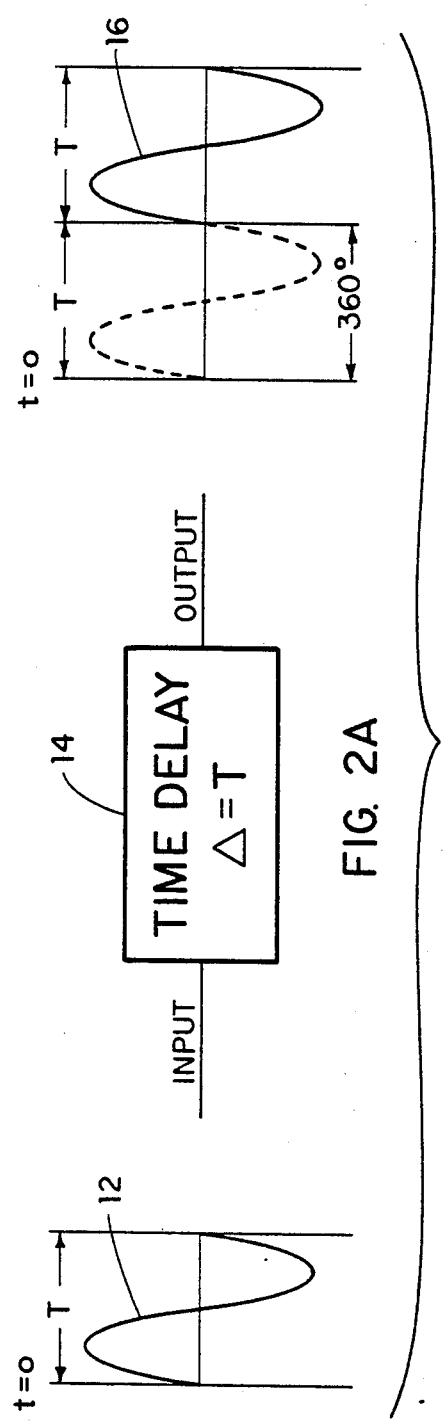
Figure 2B:
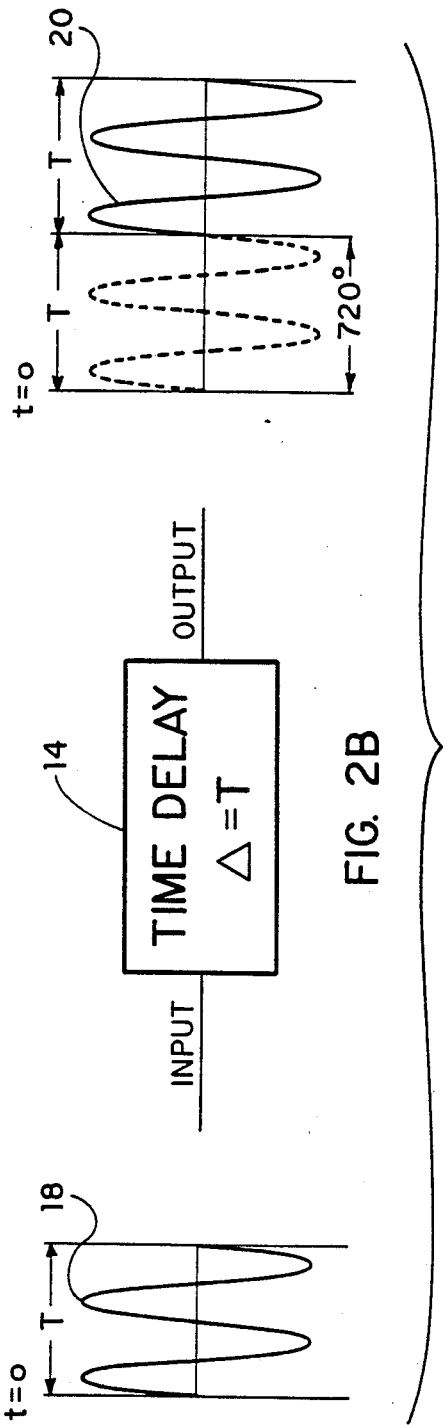

A second condition requires that in traversing a channel all signal components maintain their original relationships, i.e. that the signal components not be shifted relative to each other. An equivalent statement is that each signal component must undergo the same time delay during transmission. Referring to FIG. 2A, a sinusoidal waveform 12 is applied to the input of a delay unit 14, which has a fixed time delay $\Delta$. Assume for convenience that the time delay $\Delta$ equals the period T of the waveform 12, i.e. the output signal 16 from the delay unit 14 appears T seconds after the corresponding portion of the signal 12 is applied to the input of the delay unit 14. It may be seen from inspection of FIG. 2A that the input signal 12 will have undergone one full cycle before the output signal 16 (solid line) appears, i.e. there is a phase shift of 360° between input and output because of the fixed delay undergone by the output signal 16. FIG. 2B represents a signal 18 of frequency 2f applied to the delay unit 14, and also shows the corresponding output signal 20 (solid line). During the time delay, the input signal 18 undergoes two complete cycles before the output signal 20 appears, i.e. there is phase shift of 720° between input and output. By analogy, it will be appreciated that higher frequency components will undergo proportionally greater phase shifts when experiencing the fixed time delay, and it will be seen that constant time delay requires phase shift proportional to frequency so that all components of the digital signal maintain the same relative time positions.

Figure 3:
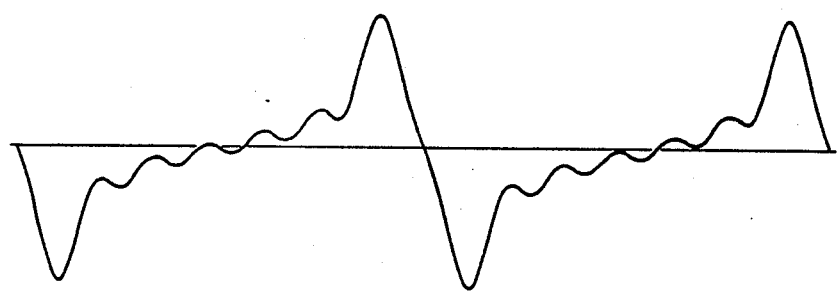

FIG. 3 shows the results of transmitting the signal 10' of FIG. 1B through a channel having uniform amplitude response, but one in which the phase shift is not linearly portional to frequency. The channel phase shift is fixed, for purposes of illustration, at 90° for all the component frequencies. A channel having such a characteristic would not have constant time delay; the various frequency components, each shifted by 90° relative to itself, would traverse the network in different times and would combine at the output and provide the distorted waveform of FIG. 3.

It will thus be appreciated that the suitability of a channel for transmission of digital data requires essentially uniform amplitude response and linear phase shift with frequency over the bandwith of interest. Actual channels, generally, do not meet these criteria. For example, in considering the amplitude response of a twisted pair transmission line, distributed capacitance, and series resistance and inductance give rise to amplitude distortion as a function of frequency. Similarly, a magnetic tape playback channel does not have uniform amplitude response; a playback transducer, responsive to rate of change of flux read from the magnetic tape, has a rising output with frequency to a maximum output, and then the output decreases as a function of frequency becoming zero when the transducer gap length equals the recorded wavelength. Phase responses of actual channels also depart from the ideal; rather than being linear with frequency the phase responses of many channels exhibit non-linear variations with frequency.

The purpose of equalization is to compensate for these amplitude and phase variations. The general technique is to cascade a network having a compensating transfer function with the channel being equalized; such compensation being essentially the inverse of the undersirable channel characteristic. The resultant transfer function of the channel and network combination thereby provide the uniform amplitude and linear phase requirements for non-distorting transmission. It will be appreciated that in broad band applications, the channel may have different characteristics in different regions of the frequency spectrum. For example, in the magnetic reproduce channel described above, the output rises with increasing frequency in one part of the spectrum, and falls with increasing frequency in another. Equalizers for such channels require several equalizing sections and involve a series of adjustable equalization parameters, whose adjustments are generally complex and time consuming. Apparatus for expediting equalization is, therefore, of interest.

While a properly equalized channel is a requirement for the transmission of undistorted digital signals, there is a maximum rate at which such signals can be transmitted. In an unequalized channel, this maximum transmission rate cannot be achieved; the signals will mutually interact at some lower rate during transmission as to preclude the unambiguous recovery of data. This mutual interaction is known as "intersymbol interference", and it must be minimized for optimum digital transmission by proper equalization of the channel.

The statement of the condition controlling the maximum signal rate transmittable through a properly equalized channel was enunciated by Nyquist, and is denoted as the "minimum bandwidth theorem". The therorem states that if synchronous impulses, having a transmission rate of fs symbols per second, are applied to an ideal low pass channel, i.e. one equalized in amplitude and phase, and having a cutoff frequency $fc = fs/2$ Hz, then the responses to these impulses can be observed independently, i.e. without intersymbol interference [Feher, "Digital Communications", Prentice Hall, 1981, p. 97]. Such a channel is designated as a Nyquist channel, and is said to be capable of transmitting at the Nyquist rate.

Figure 4A:
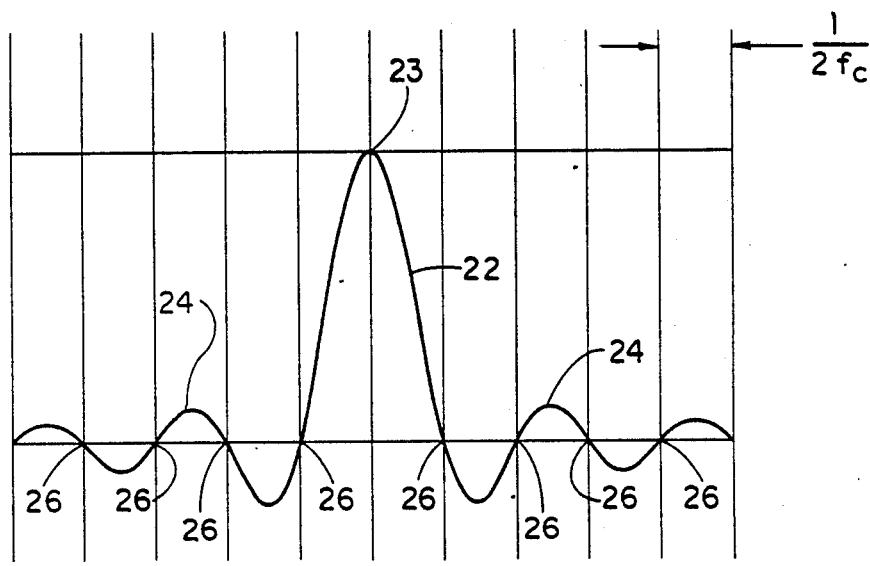

Referring to FIG. 4A, the response of a properly equalized channel to an isolated impulse is first illustrated. The response 22 consists of a central peak 23 with leading and trailing oscillatory tails 24; the response 22 is of the form of (sin X) /X, and the resultant zero crossings 26 of the response 22 occur at time intervals $Ts = 1/2fc$.

Figure 4B:
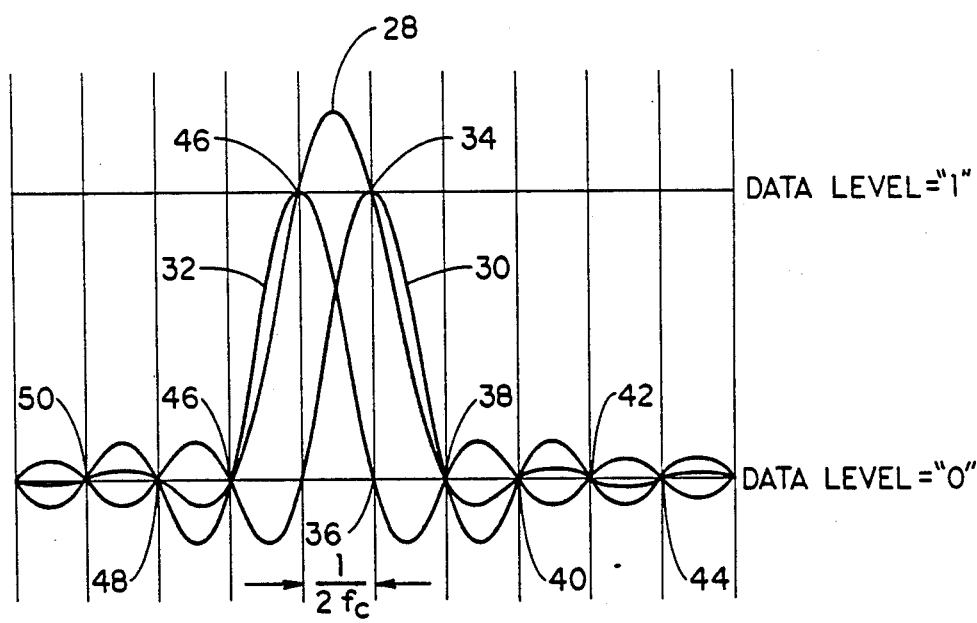

When a series of impulses are transmitted at the Nyquist rate, the impulse responses of sequential impulses will partially overlay each other, but the data may be unambiguously recovered if the channel is properly equalized. Referring to FIG. 4B, an equalized channel response 28 is shown for two impulses 30, 32 separated by the time interval $1/2fc$, corresponding to the Nyquist rate. The peak 34 of the impulse response 30 falls on the first zero crossing 36 of the oscillatory portion of the response 32, and the oscillating tails of both responses intersect only at the zero crossings 38, 40, 42, 44, 46, 48, 50. Because of this unique overlap condition, it is possible to unambiguously recover the data represented by the two impulses by sampling the data at specific time intervals spaced $1/2fc$ apart and so phased that the sampling is synchronized to the peaks 34, 46 of the individual impulses responses 32, 30. At sample times 38, 40, 42, 44, 46, 50 neither pulse 30 or 32 contributes to the output since both signals are crossing zero at those times. It will be appreciated that while the peak of the composite response 28, which is the sum of the signals 30, 32, will have an amplitude greater than either of the component impulse responses 30, 32, the output data is defined by the Nyquist theorem only at the unique sample times when the recovered data has either the amplitude "1", the peak level of a single isolated impulse response, or a "0" which is the level resulting when there is no impulse response.

Figure 5:
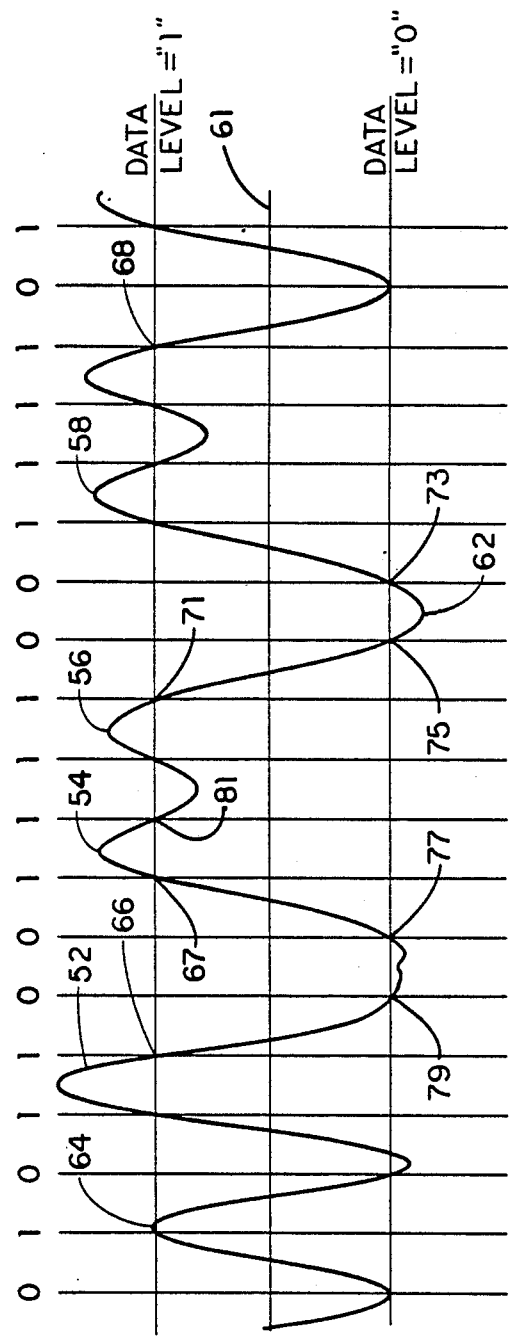

For more complex digital patterns, such as a random stream of data consisting of "0's" and "1's", the response at the Nyquist rate of a properly equalized channel is illustrated in FIG. 5. Again, it will be observed that signal peaks 52, 54, 56, 58, 62 may be greater than the amplitude of an isolated impulse, e.g. 64, due to the random interaction and superposition of the individual impulse responses. The values of the waveforms at sample times, e.g. 66, 67, 68, 71, 73, 75, 77, 79, 81, however, are unambiguously determined as previously described.

Pulses employed for sampling are obtained from a clock signal which in turn may be recovered from the coded signal itself. Among such clock recoverable codes are certain forms of non-return-to-zero code (NRZ), and the modified frequency modulation code (MFM).

Digital channel equalization requires a measurement technique responsive to both amplitude and phase adjustments. In view of the characteristics of the Nyquist channel, a suitable technique is one in which the channel to be equalized is excited with a random sequence of impulses at the Nyquist rate, and the phase and amplitude equalizer controls are adjusted for minimum intersymbol interference in the response. The approach to proper equalization is signalled by the decrease in intersymbol interference. In determining the amount of intersymbol interference present, a particularly effective visual display technique is the "eye pattern" technique known in the prior art.

Figure 6A:
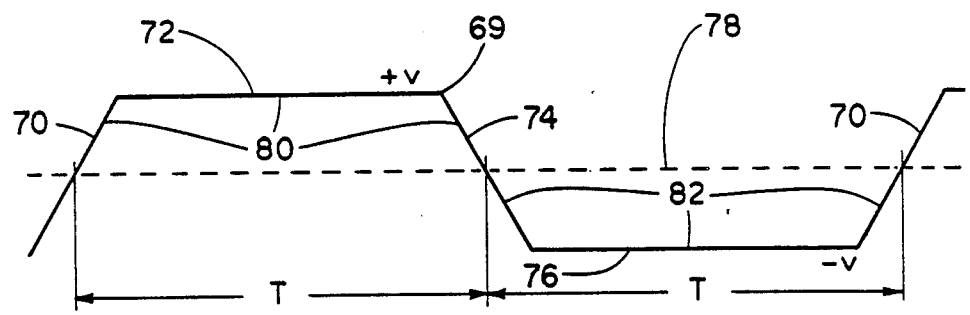
Figure 6B:
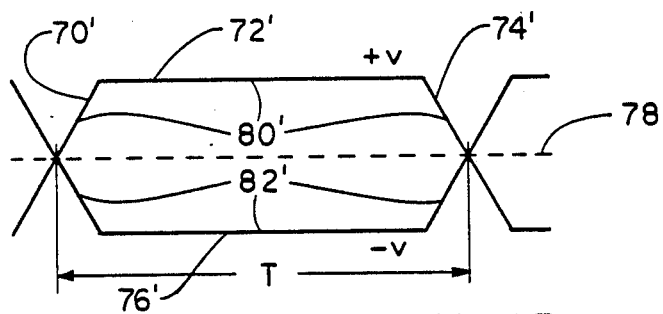
Figure 6C:
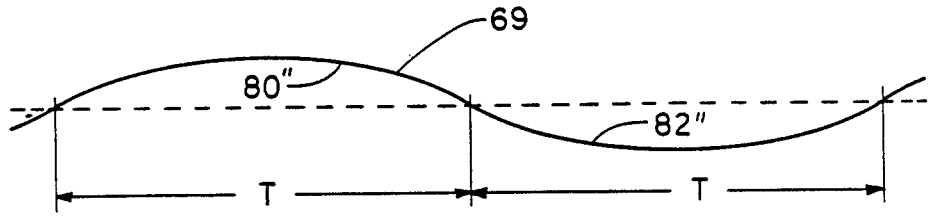
Figure 6D:
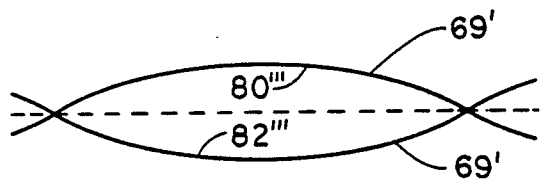

Generating an eye pattern display may be understood by reference to FIG. 6A, which illustrates a signal waveform 69 having a rising edge 70, a constant high signal value (+V) 72, a falling edge 74, and a constant low signal value (−V) 76 as viewed on an oscilloscope using a conventional sweep. A reference level 78 is shown symmetrically located with respect to the (+V) 72 and (−V) 76 levels; the positive portion of the signal waveform 80 has a duration T seconds, and the negative portion 82 also has a duration of time T seconds. If the sweep time of the oscilloscope is adjusted to a duration T seconds, and the oscilloscope sweep is triggered every T seconds, the display will be as shown in FIG. 6B. The resultant waveform obtains because on one sweep the positive portion of the signal waveform 80 is displayed, and on the next sweep the negative portion of the signal waveform 82 is displayed. For a continuous waveform the pattern is stationary, and it will be appreciated that the display takes on the appearance of an "eye". If the signal in question were transmitted through a network, say, of limited bandwidth, so that the signal waveform was distorted into the waveform 69 of FIG. 6C, the resultant eye pattern would be as shown in FIG. 6D. Compared to the original eye pattern, FIG. 6B, there is a decrease in the openness of the eye due to distortion.

Figure 7:
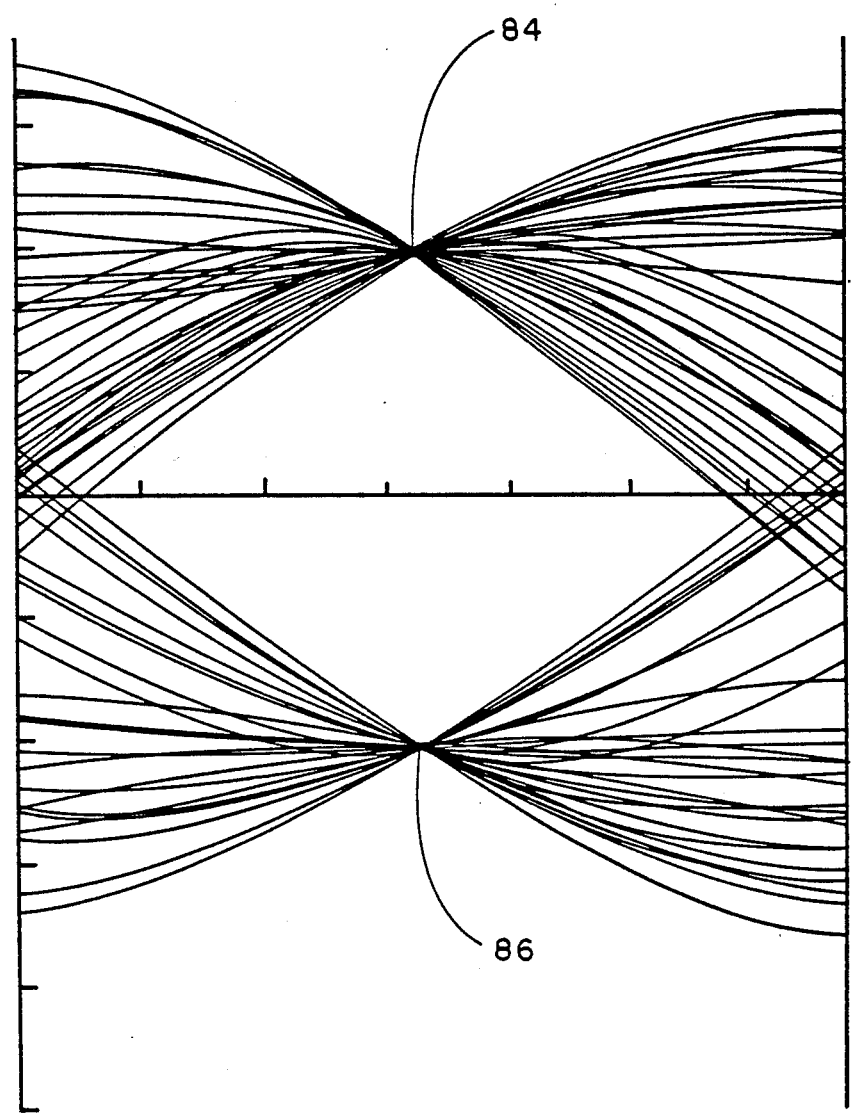
FIGS. 7 and 8 are waveforms of "eye patterns" known in the prior art, and as such are useful in understanding the operation of the invention.
Figure 8:
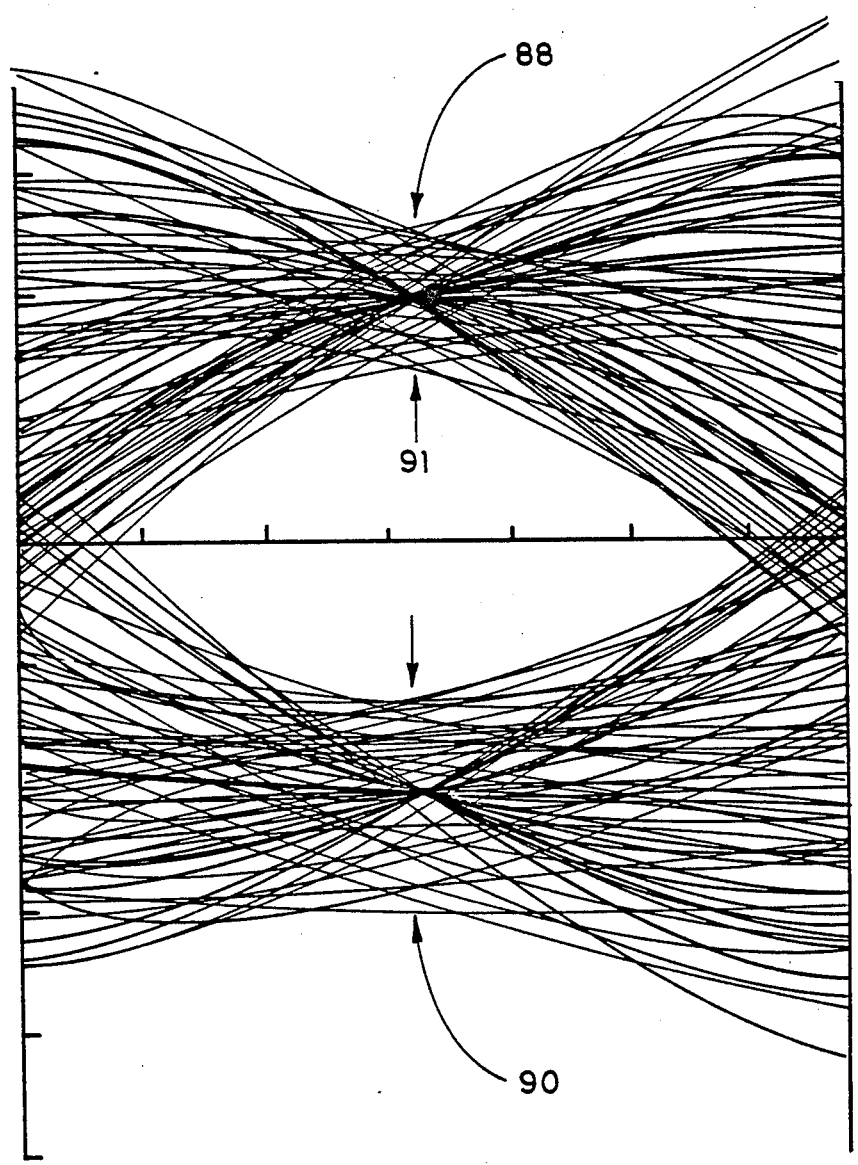

When the eye pattern technique is applied to the signal waveform of FIG. 5, an eye pattern as shown in FIG. 7 is obtained. Because FIG. 5 shows the response of an ideal channel to impulses at the Nyquist rate, it will be appreciated that the eye pattern display of FIG. 7 shows no intersymbol interference. That is, the signal waveform trace of each impulse response passes through unique points, e.g. 84, 86, corresponding to "1" to "0" at the sample times. If the equalization of the channel were not optimum, intersymbol interference would occur and the impulse response traces would not intersect in one point, but would spread over bands 88, 90 as seen in FIG. 8, causing a reduction 91 in the eye opening. It will be appreciated that the degree of openness of the eye is a measure of the reduction in channel distortion, and of the effectiveness of the equalization.

In the prior art, the conventional equalization procedure employs visual inspection of the eye pattern while adjusting the equalizer. This procedure has the drawback that for a less-than-open eye pattern, it is not always easy to visually evaluate the effects of equalizer adjustment due to the fuzziness of the eye pattern display. It is, therefore, advantageous to provide instrumentation which quantifies the determination of the openness of the eye pattern during equalization. While such instrumentation exists in the prior art [Feher, Digital Communications, Microwave Applications, Prentice-Hall, 1981, p. 232–236], it is limited in resolution, and provides information only as to the peak or rms value of the openness of the eye.

SUMMARY OF THE INVENTION

The invention teaches applying a clock recoverable signal, after it has been first processed by the equalizer, to a baseline corrector. The baseline corrector removes the effects of additive noise, multiplicative noise, and base line shift which affect signal amplitude, and improves the signal stability so the effects of equalizer adjustment may be more readily ascertained. The increased stability of the signal provided through the use of the base line corrector also simplifies the recovery of the clock from the clock recoverable signal.

The invention also teaches converting the amplitude of the corrected and equalized signal into a corresponding pulse width modulated signal, wherein the pulse width is proportional to the signal amplitude value obtained when the signal is sampled in accordance with the Nyquist criterion. When the channel is properly equalized, the derived pulse width signals are all essentially of the same width, since there is a minimum of intersymbol interference in a properly equalized channel. If the channel is not properly equalized, then the pulse width signals corresponding to the sampled amplitudes are wider or narrower than the width of the unambiguous signal value which would have been derived from a properly equalized channel.

The pulse width modulated signals are applied to a time interval analyzer which displays a histogram of the number of signals of a given pulse width applied versus the pulse width itself. In a properly equalized channel the histogram will essentially display a single vertical bar at the pulse width corresponding to the unambiguous signal value. In an unequalized channel, the histogram will show traces relating to pulse width signals both wider and narrower than the unambiguous signal width, indicating intersymbol interference arising from the mutual interference of impulse responses at the sample time.

The practice of the invention provides a measure of the intersymbol interference of signals traversing the channel which is indicated by the width of the histogram display of the time interval analyzer. Instead of a pattern of changing and overlapping traces as seen in the conventional eye pattern for an unequalized channel, the invention provides a sorting of interfecing symbols into a stable histogram that quantifies by the width of the histogram, the amount of intersymbol interference. The asymmetry of the intersymbol interference, i.e. the relative number of symbols that are greater or lesser in amplitude than the unambiguous signal is also displayed. It will be appreciated that unlike a device which only measures the peak or rms values of the signals comprising the eye pattern at sample time, the present invention measures the "dispersion" of the signal amplitudes about the sample point and provides a quantifiable measure of both the eye openness and the degree of intersymbol interference remaining after equalization.

The time interval analyzer also provides digital outputs which quantify the displayed dispersion. By means of these outputs, the invention is also applicable to apparatus for the automatic control of channel equalization.

DESCRIPTION OF THE INVENTION

Referring to FIG. 9, a clock recoverable input data signal 92, transmitted through a channel to be equalized, is applied to an equalizer network 94 and then to a baseline corrector circuit 95. The equalizer network 94, whose purpose is to compensate for the phase and amplitude distortion of the channel, does not eliminate the effects of other pertubations that may degrade the signal. Such pertubations include additive noise, multiplicative noise, and duty cycle variations in the signal which cause baseline shifts with attendant signal amplitude variations. These variations cause eye pattern closure identical to that caused by the intersymbol interference of an improperly equalized channel.

Figure 10A:
Figure 10B:
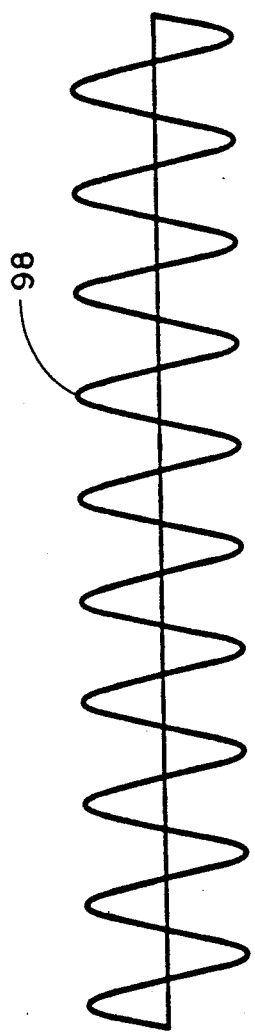
Figure 10C:
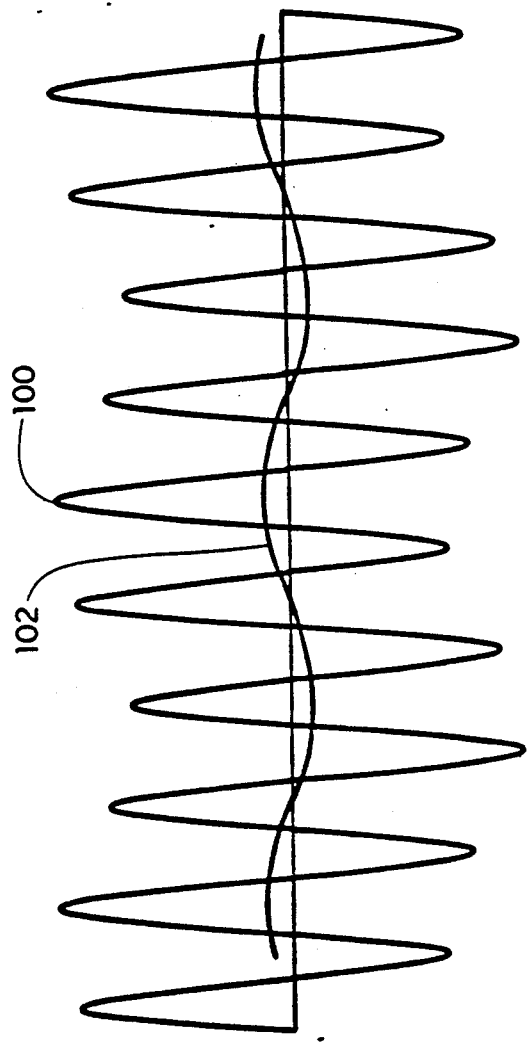

The origin of such pertubations is described and an apparatus for correcting the resultant baseline shift is disclosed in copending application U.S. Ser. No. 650,596. As an example of a problem discussed in application Ser. No. 650,596, FIG. 10 shows the effect of additive noise 96 (FIG. 10A) on a signal 98 (FIG. 10B). The resultant signal amplitude 100 (FIG. 10C). varies due to the noise 96. application Ser. No. 650,596 teaches detection of the amount of baseline shift 102 and the subtraction of such shift from the perturbed signal 100 to restore the original signal 98. The aforementioned application also teaches the detection and correction of baseline shift due to multiplicative noise and to signal duty cycle variations.

Referring again to FIG. 9, application Ser. No. 650,596 also describes recovery of a clock with reduced jitter by applying the baseline corrected signal 104 to a phase locked loop 106. The phase locked loop 106 synchronizes on zero crossings of the baseline corrected signal 104 which reduces jitter in the recovered clock, this being because the accuracy of the zero crossings of the signal 104 is improved by the stability of the baseline after correction. A properly phased sampling signal 108 is also derived from the clock recovery circuit. The baseline corrected signal 104 is also applied to a rectifier 110, the output signal 112 of which feeds a sample and a hold circuit 114. At the sample time, the sample pulse 108 activates the sample and hold circuit 114 which stores the amplitude of the rectified signal 112. The sample pulse 108 is also applied to a linear ramp generator 116 whose ramp output 118 is applied to one input of a comparator circuit 120. The other input to the comparator 120 is the stored voltage 122 of the sample and hold circuit 114. When the ramp output signal 118 equals the stored voltage of the circuit 114 the comparator unit 120 emits a signal 124 which activates a pulse width generator 126 whose output is transferred to the "on" state. This output pulse is returned to the "off" state by a reset pulse 130 generated by reset circuit 132. The timing of these operations will be later described in connection with FIG. 12.

Figure 11A:
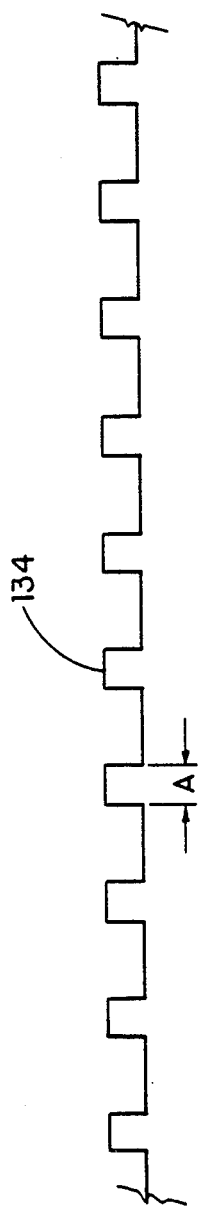

With the amplitudes of the input signal coverted into equivalent pulse width signals, the pulse width train is applied to a time interval analyzer such as the Model 150 Time Interval Analyzer manufactured by ADC Corporation of Tustin, Calif. Referring to FIG. 11A, a wavetrain comprised of equal width pulses 134 applied to a time interval analyzer results in a display 138 (FIG. 11B) consisting of a single bar whose height is comprised of the number of equi-width pulses applied. [The vertical scale of a typical time interval analyzer is logarithmic, but for clarity the illustrated scale 140 is shown as a linear scale.] In FIG. 11C, a pulse train comprised of different width pulses 136 results in a display 142 (FIG. 11D). In an actual display, only the envelope of the maximum values 143 of the component elements of the histogram is seen when viewing the display. A pulse train corresponding to an unequalized signal comprised of many pulses of varying pulse widths may result in a display as shown in FIG. 11E. During the equalization procedure, the equalizer is adjusted to minimize the width of the histogram 144.

With the above description in mind, the timing of the circuits may be understood by reference to FIG. 12. The data signal 104' after baseline correction is shown in FIG. 12A, and the clock 147 derived from this signal by means of the phase locked loop 106 (FIG. 9) is shown in FIG. 12B. The rectified data signal 112', available at the output of the rectifier circuit 110 (FIG. 9), is illustrated in FIG. 12C. By reference again to FIG. 5, it will be appreciated that unambiguous signal values (e.g. 66, 67, 68, 71, 81, 73, 75, 77, 79) are symmetrically located with respect to the baseline 61 in a properly equalized channel, and that the absolute magnitudes of the positive (e.g. 66, 67, 68, 71, 81) and negative (e.g. 73, 75, 77, 79) signals relative to the baseline 61 will therefore be equal in amplitude. Since it is the absolute magnitude of signal which is of interest, the sampling of the rectified signal 112' (FIG. 12C) allows obtaining the amplitudes of both the positive and negative signals by means of unidirectional sampling pulses 108' (FIG. 12D). The sampling pulses 108' coincide with the clock transitions (150) occurring in the respective centers of bit cells. At each sample time, the value of the amplitude of the rectified signal is held (e.g. 122' FIG. 12E) by the sample and hold circuit 114 until the next sample time, and the ramp voltage 118' is also initiated. When the ramp voltage 118' equals the stored signal, e.g. 160, the output pulse, e.g. 166, is set "on" (FIG. 12F). The ramp 118' is reset at a fixed time 168 after the beginning, but before the center 150, of each signal cell, and the output pulses, e.g. 170, are set to "off" at the same time.

The widths of the negative going output pulses, e.g. 170, are proportional to the corresponding data signal amplitude at the time of sampling. This output pulse stream is then applied to the time interval analyzer as previously described.

Figure 11B:
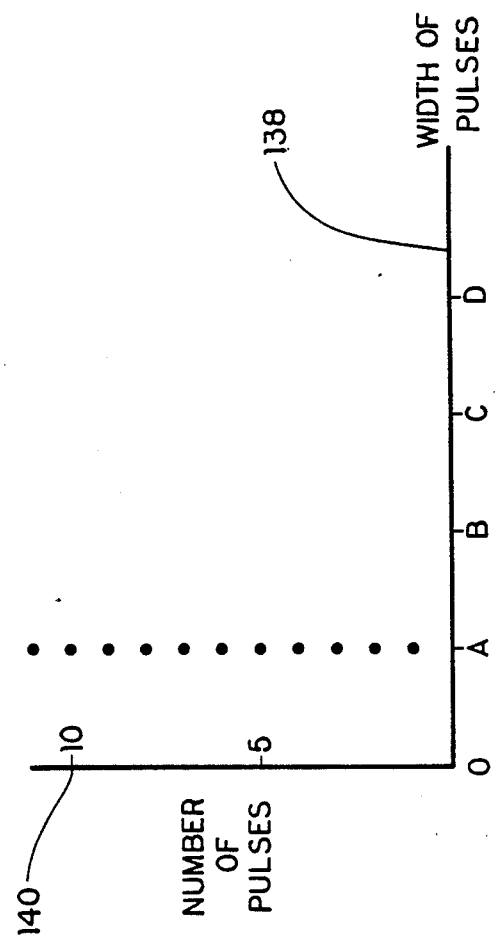
Figure 11C:
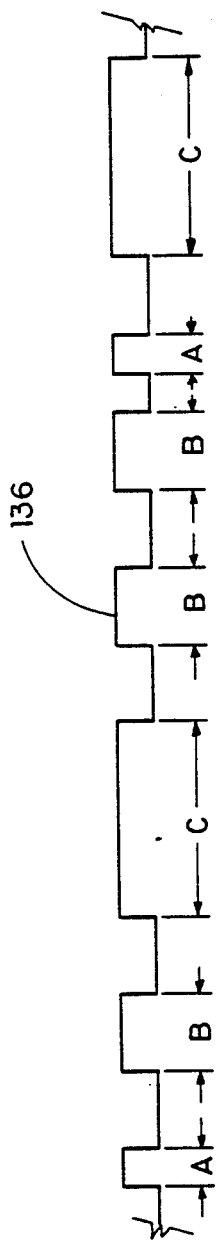
Figure 11D:
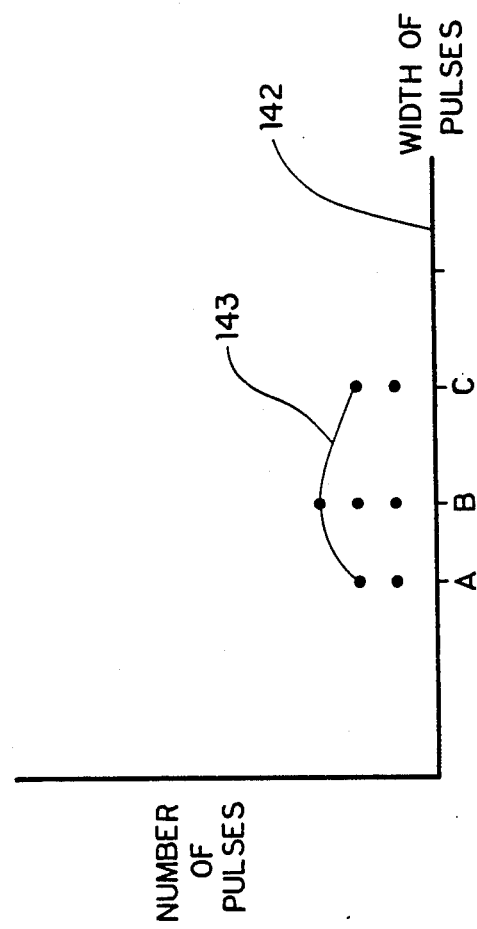
Figure 11E:
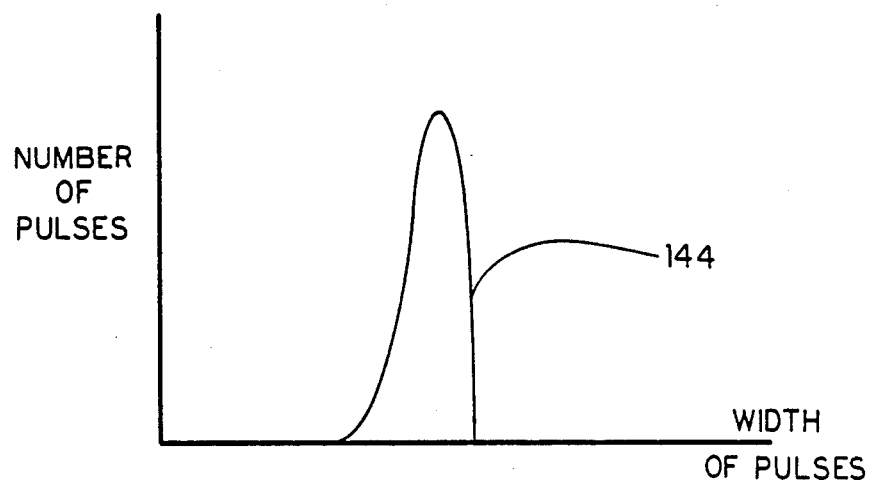

In summary, a histogram that indicates the equalization of the signal 104' would comprise, for example, (FIG. 12F), two "dots" for pulse widths a, a,; one "dot" for pulse width b, one "dot" for pulse width c; one "dot" for pulse width d (etc.) . . . with the closeness of similarity to a straight vertical line of "dots" appearing on the display of FIG. 11B being most representative of the quality of equalization.

The invention has been described in detail with particular reference to preferred embodiments thereof, but it will be understood that variations and modifications can be effected within the spirit and scope of the invention. For example, the operation of the invention has been described in terms of impulses applied to the channel. The invention is applicable to any binary digital signal, because any binary pulse of duration T is equivalent to a positive impulse separated from a negative impulse by time T, followed by an integrator ["Data Transmission", Bennett and Davey, McGraw-Hill 1965, pp. 59–60]. Such binary pulses will result in similar eye patterns to those generated by impulses, and adjustment of the channel equalization may equivalently be performed when such binary pulses are employed.

What is claimed is:

1. Apparatus for the measurement of the intersymbol interference of a digital output signal after transmission through a channel, wherein said intersymbol interference is related to the quality of equalization of said channel; said apparatus comprising:
   a. means for applying an input digital signal to said channel at the approximate Nyquist rate of said channel,
   b. means for receiving the output signal of said channel responsive to said input digital signal,
   c. means for generating phased sampling signals relative to said output signal,
   d. means for obtaining amplitude samples of said output signal by means of said sampling signals,
   e. conversion means for producing corresponding pulse width samples from said amplitude samples, and
   f. measurement means for determining the quantities of said pulse width samples having predetermined magnitudes of pulse widths, whereby said quality of equalization of said channel is related to the dispersion of said samples over the range of said pulse width samples.

2. The apparatus of claim 1 wherein said digital signal is an NRZ signal.

3. The apparatus of claim 1 wherein said measurement means for determining the quantities of said pulse width samples having predetermined magnitudes of pulse widths is a time interval analyzer.

4. Apparatus for the measurement of the degree of openness of an eye pattern derived from a digital signal, said apparatus comprising:
   a. means for deriving phased sampling signals from said digital signal,
   b. means for sampling the amplitude of said digital signal by means of said sampling signals,
   c. means for converting said sampled amplitudes to corresponding pulse duration signals, and
   d. means of measuring the dispersion of the durations of said pulse duration signals, whereby the degree of openness of said eye pattern is determined.

5. Apparatus for measurement of amount of intersymbol interference of a clocked digital signal, said apparatus comprising:
   a. baseline correction means for eliminating effects of baseline perturbations on said digital signal,
   b. clock recovery means cooperating with said baseline correcting means for deriving a clock signal from said digital signal,
   c. sampling means cooperating with said clock signal for obtaining selected amplitude values of said digital signal,
   d. modulation means for converting said amplitude values to corresponding pulse duration signals, and
   e. means for measuring dispersion of the durations of said pulse duration signals, whereby the amount of intersymbol interference is determined.

6. The apparatus for the measurement of the amount of intersymbol interference of claim 5 wherein said means of measuring dispersion is a time interval analyzer.

* * * * *